United States Patent [19]

Mohiuddin

[11] 4,350,739

[45] * Sep. 21, 1982

[54] MOLDED PLASTIC PART

[75] Inventor: Gulam Mohiuddin, Brighton, Mich.

[73] Assignee: International Telephone and Telegraph Corporation, New York, N.Y.

[*] Notice: The portion of the term of this patent subsequent to Aug. 4, 1998, has been disclaimed.

[21] Appl. No.: 162,682

[22] Filed: Jun. 25, 1980

Related U.S. Application Data

[63] Continuation-in-part of Ser. No. 61,633, Jul. 30, 1979, abandoned.

[51] Int. Cl.³ .................... B32B 27/40; B32B 27/36; B32B 27/38; B29F 1/10
[52] U.S. Cl. .................... 428/425.1; 264/250; 264/255; 264/269; 264/328.6; 264/328.18; 428/543; 428/913.3
[58] Field of Search .................... 264/46.6, 48, 45.5, 264/DIG. 18, DIG. 83, 46.4, 250, 255, 269, 328.6, 328.18; 428/542, 543, 425.1

[56] References Cited

U.S. PATENT DOCUMENTS

| | | | |
|---|---|---|---|
| 3,268,636 | 8/1966 | Angell | 264/45.5 X |
| 3,436,446 | 4/1969 | Angell | 264/45.5 X |
| 3,468,991 | 9/1969 | Krug | 264/DIG. 18 |
| 3,487,134 | 12/1969 | Burr | 264/46.8 X |
| 3,694,530 | 9/1972 | Wolfe | 264/48 |
| 3,745,203 | 7/1973 | Harper | 264/DIG. 83 |
| 3,970,732 | 7/1976 | Slaats et al. | 264/DIG. 83 |
| 3,981,671 | 7/1976 | Edwards | 264/DIG. 83 |
| 4,123,488 | 10/1978 | Lawson | 264/255 X |
| 4,239,796 | 12/1980 | Shanoski et al. | 264/250 X |
| 4,239,808 | 12/1980 | Arnason | 264/255 X |
| 4,242,415 | 12/1980 | Feltzin et al. | 264/255 X |
| 4,282,285 | 8/1981 | Mohiuddin | 428/315 |

FOREIGN PATENT DOCUMENTS

| | | |
|---|---|---|
| 1865 | 5/1979 | European Pat. Off. |
| 641903 | 8/1950 | United Kingdom . |
| 889486 | 2/1962 | United Kingdom . |
| 991653 | 5/1965 | United Kingdom . |
| 1148720 | 4/1969 | United Kingdom . |
| 1239099 | 7/1971 | United Kingdom . |
| 1339046 | 11/1973 | United Kingdom . |
| 1362162 | 8/1974 | United Kingdom . |
| 1432711 | 4/1976 | United Kingdom . |

OTHER PUBLICATIONS

Parker, H. R. "Injection Molding; Injection Molding Thermoplastics," In *Modern Plastics Encyclopedia 1978-1979*, pp. 304-306, 308, 310, 312, 313.

Tanner, G. A. "Compression Molding," In *Modern Plastics Encylopedia 1978-1979*, pp. 256, 258, 261.

*Primary Examiner*—Philip E. Anderson
*Attorney, Agent, or Firm*—James B. Raden; Harold J. Holt

[57] ABSTRACT

A molded plastic part having a plastic substrate and a firmly adherent coating thereon. The molded part is produced from a reactive plastic molding material as the substrate by coating the surface of a mold, prior to molding the part, with a coating composition containing a reaction promoter for the reactive plastic molding material, introducing the reactive plastic molding material into a mold, molding the part and removing the part from the mold.

17 Claims, No Drawings

MOLDED PLASTIC PART

This application is a continuation-in-part of my copending application Ser. No. 061,633, filed July 30, 1979 now abandoned.

This invention relates to a process for producing a molded plastic part and to a molded part so produced having a plastic substrate and a firmly adherent coating thereon.

My copending U.S. application Ser. No. 149,996, filed May 15, 1980 is directed to a process for producing a polyurethane molded part by reaction injection molding in which the molded part is coated within the mold with a coating composition applied to the mold surface. A number of advantages flow from the in-mold coating process including a more uniform and firmly adherent coating on the part and a substantial reduction in the number and cost of post-molding operations. The aforesaid application Ser. No. 149,996 is hereby incorporated by reference in the present application.

The present invention involves the discovery that the aforesaid process is applicable to other molding processes and that equivalent improvements in coating uniformity and adherence are obtained. Specifically, the present invention involves producing a molded part from a reactive plastic molding material as the substrate by coating the surface of a mold, prior to molding said part, with a coating composition containing a reaction promoter for the reactive plastic molding material, introducing the reactive plastic molding material into a mold, said reaction promoter being present in an amount sufficient to transfer said coating composition from said mold surface and bond it to the substrate formed by said reactive molding material, molding said part and removing said part from the mold. The molded part upon removal from the mold comprises a plastic substrate and a firmly adherent coating thereon.

The invention is useful with both injection and compression molded plastic parts. The compression and injection molding of thermosetting and thermoplastic resins is well known and is described at many places in the literature, as for example, in *Modern Plastics Encyclopedia*, October 1978, Vol. 55, No. 10A, pages 256–261 and 304–313. The invention is also useful with other molding operations using reactive molding material including transfer molding and casting.

The as molded surface of compression molded products is aesthetically undesirable for reasons such as porosity, sink marks due to shrinkage and/or blemishes. The present process transfers a coating to the surface of the molded part during the molding operation and creates a smooth unblemished surface. In addition, as in the case of reaction injection molding, the in-mold coating process of the invention produces a more uniform and firmly adherent coating on the molded part and substantially reduces the number and cost of post-molding operations.

In carrying out the invention, the surface of the mold is first uniformly coated with a coating composition containing a reaction promoter for the reactive polymer in an amount sufficient to transfer the coating composition from the mold surface to the molded part and bond it to the latter. The amount of the reaction promoter will normally range from as little as 0.05% to as much as 10% based on the total coating weight. However, reaction promoter amounts greater than 10% may be used, although normally they are unnecessary, and amounts even less than 0.05% may be adequate if a strong reaction promoter is employed. The coating plus reaction promoter is conveniently applied to the mold surface by spraying the coating at 30 to 60 psig in a solvent at about 10–35% solids content. In compression and injection molding, the mold surface may range from below ambient temperatures to elevated temperatures, e.g. from 50° to 450° F. The process of the invention is useful with a wide variety of metal mold surfaces, as for example, steel, aluminum, chrome and nickel plated steel, electroform nickel and kirksite (a zinc alloy) and with other mold surfaces such as epoxy and silicone. Flash time, for evaporation of thinner after coating the mold surface and prior to molding, will normally vary for compression and injection molding from 15 to about 60 seconds, depending on mold temperature and solvent composition.

The substrate is a reactive plastic molding material. By reactive plastic molding material, we intend to identify the starting materials from which the molded part is made, which starting materials undergo polymerization and/or crosslinking during the molding cycle. Included within this definition are the large number of thermosetting polymers which undergo during the molding cycle further reaction and/or crosslinking in the presence of a reaction promoter which can be a catalyst, crosslinking promoter or crosslinking initiator. Examples of such reactive thermosetting polymers are polyurethanes, unsaturated polyesters, epoxy resins and phenolics. Typical examples of reaction promoters for polyurethanes are organo-metallic catalysts such as dibutyltin dilaurate, stannous octoate or phenyl mercuric propionate. Other polyurethane catalysts are disclosed in my aforesaid copending application Ser. No. 149,996. The polyurethanes here useful as reactive plastic molding materials are not necessarily the same urethane polymers which are processed by reaction injection molding techniques. The polyols used in preparing the present urethane polymers are not necessarily capped with ethylene oxide to give high reactivity, as in the case of polyols used in reaction injection molding. However, the catalysts disclosed in my copending application Ser. No. 149,996 are useful as reaction promoters in the present invention. Epoxy resins are crosslinked by amines, anhydrides, aldehyde condensation products and Lewis acids. Typical catalysts useful as reaction promoters for epoxy resins are diethylene triamine and hexahydrophthalic anhydride. Phenolic polymers are crosslinked by acid catalysts, of which a suitable example is hexamethylene tetramine and by a basic catalyst such as ammonium hydroxide. In the case of polyesters, examples of reaction promoters or as they are known, free radical or crosslinking initiators, are organic peroxides, alkyl peresters and azonitriles. Examples of peroxides are tertiary butyl peroxide, lauryl peroxide and diacyl peroxide; examples of alkyl peresters are tertiary butyl perbenzoate and tertiary butyl peracetate; an example of an azonitrile is 1-t-butyl azo-1-cyano cyclohexane. The foregoing reaction promoters may of course be used alone or in combination.

The coating may be any decorative or protective coating of the type applied by conventional coating technology to molded parts. The coatings may be either a thermoplastic or thermosetting polymer, with or without a plasticizer. The coating should of course be capable of withstanding the molding temperatures without deteriorating or decomposing. Among the useful coatings included within the foregoing description are, for example, acrylic and acrylic ester polymers, pre-reacted urethane polymers, saturated and unsaturated polyesters, epoxy esters, cellulose esters, polyolefins, vinyl and vinyl-melamine polymers and mixtures of the foregoing polymers with each other or with other coating compositions. A preferred class of coatings for polyurethane substrates are those based on urethane or acrylic polymers. For polyesters, a preferred class of coatings are those based on urethanes or polyesters. The coating may be used either as protective coatings or with a pigment as a paint coating. A particularly preferred class of coatings are paints and paint primers. The paint primers may be applied within the mold and the molded part thereafter top coated after removal from the mold. The paint primer may be a thermoset acrylic, an acrylic-urethane mixture, a one-component polyurethane, a polyester such as a modified alkyd or a vinyl-base paint such as vinyl-melamine. The paint composition may contain, in addition to the resin, an organic solvent such as cellosolve acetate, methyl ethyl ketone, mineral spirits or butanol and a diluent such as toluol or xylol. It may also contain a pigment such as titanium dioxide or carbon black, the latter to impart conductivity for electrostatic top coats. It may also contain plasticizers such as dibutyl phthalate or tricresyl phosphate, flow agents and other additives.

The paint coating applied within the mold may be the sole coating on the furnished molded part. In certain instances, as for example, for exterior molded components for cars, it may be desirable for esthetic reasons, to apply a top coat to the paint after molding. In the latter case, the in-mold paint composition will normally be a paint primer such as a conventional urethane based resin primer or a modified acrylic resin based primer containing a polymethylmethacrylate or polyethylmethacrylate type of acrylic resin. Since there is no mold release used in the molding operation, the part does not have to go through an extensive cleaning and drying operation and this saves considerable time and cost. If desired, the part can thus be further coated, without intervening steps, to give the desired gloss level and color matching. In many non-automotive applications, this step may not be necessary since the part already has a coating.

The following examples illustrate the practice of the invention. All parts and percentages, unless otherwise indicated, are by weight.

EXAMPLE 1

This example illustrates the preparation by compression molding of a molded plaque having a polyester substrate and a polyurethane coating. A 12-ton hydraulic press with electrically heated platens and an aluminum mold with matched die surfaces was used for molding an unsaturated polyester compound by compression molding. The formulation used for this example contained 60 parts of unsaturated polyester dissolved in styrene monomer (64% polyester, 36% styrene), 40 parts of a thermoplastic copolymer as a low shrink additive, 1.5 parts of tertiary butyl perbenzoate catalyst, 4.5 parts of zinc stearate mold release, 140 parts of calcium carbonate, 25 parts of aluminum silicate, 0.5 parts of a grey pigment, 4.5 parts of magnesium oxide thickener and 25% of the total weight of the formulation of $\frac{1}{2}''$ loose glass fibers.

The cavity and core of the mold was uniformly sprayed with a conventional air pressure spray gun at 45 psig to place a coating 0.5–1 mil thickness on the mold surface. The coating was a urethane type paint primer which was thinned with one-half part by weight of thinner to produce a 21% by weight solids content paint composition. The paint primer contained a blocked polyurethane, a paint curing agent (in the proportion of 6 parts polyurethane to one part of curing agent), a plasticizer and a color imparting pigment.

The paint primer contained 5% by weight of tertiary butyl perbenzoate as a reaction promoter for the unsaturated polyester. The mold surfaces were sprayed with the paint primer and allowed to flash for 30 seconds (time for solvent evaporation). The unsaturated polyester compound was charged into the mold cavity and the mold closed. The mold temperature was 250° F. A clamping pressure of 5 tons was applied to the mold. After three minutes of curing the mold was removed from the clamp and the part was removed from the mold. An examination of the resulting molded product showed that the coating had transferred from the mold surface to the polyester substrate. The coating was approximately 0.5–1 mil in thickness. Adhesion per ASTM test method #D3359 and coverage of the coating on the plastic part was excellent. The part was free of surface imperfections.

EXAMPLE 2

Example 1 was repeated, substituting however a one component commercially available acrylic-polyester primer system as the coating. The primer system was reduced with toluene to about 30% by weight solids content. The paint primer contained 5% by weight of lauryl peroxide. The primer was sprayed onto the mold cavity and core. Paint flash off time was 30 seconds. Mold temperature was 300° F. Demolding time was 4 minutes. Transfer of paint coating to the substrate was good. Adhesion per ASTM test method #D3359 and coverage of the coating was again excellent. The part was free of surface imperfections.

EXAMPLE 3

Example 2 was repeated using 3% of t-butyl perbenzoate as reaction promoter for transfer of the coating from mold surface to substrate. The acrylic-polyester primer was sprayed onto the mold cavity and core and allowed to flash for 30 seconds. Mold temperature was 270° F. Part demolded after 3½ minutes. Paint adhesion per ASTM test method #D3359 and coverage of the substrate was excellent. The part was free of surface imperfections.

EXAMPLE 4

Example 1 was repeated without using a coating in the mold surface. Porosity and surface defects were prevalent over the entire surface of the part.

I claim:

1. A process for producing a molded plastic part comprising
    coating the surface of a mold, prior to molding said part, with a coating composition containing a reaction promoter for a reactive plastic molding material but not for said coating,
    introducing a reactive plastic molding material into the mold,
    said reaction promoter in said coating being selected from the group consisting of a catalyst, a crosslinking promoter and a crosslinking initiator for said reactive plastic molding material and being present in an amount sufficient to transfer said coating composition from said mold surface and bond it to the substrate formed by said reactive molding material, molding said part and removing said part from the mold, said molded part upon removal from the mold comprising a plastic substrate and a firmly adherent coating thereon.

2. The process of claim 1 in which the molding process is an injection molding process.

3. The process of claim 1 in which the molding process is a compression molding process.

4. The process of claim 1 in which the coating is a polyurethane.

5. The process of claim 1 in which the coating is an acrylic polymer.

6. The process of claim 1 in which the plastic molding material is selected from the group consisting of an unsaturated polyester, an epoxy resin and a phenolic resin.

7. The process of claim 6 in which the plastic molding material is an unsaturated polyester.

8. The process of claim 1 in which the reaction promoter is a free radical initiator.

9. The process of claim 1 wherein the coating on the surface of the mold is used in place of a mold release agent.

10. The process of claim 8 in which the free radical initiator is selected from the group consisting of an organic peroxide, an alkyl perester and an azonitrile.

11. The process of claim 1 in which the coating is a paint.

12. The process of claim 1 in which the coating is sprayed onto the surface of the mold.

13. The process of claim 1 in which the coating is applied to the mold surface in a solvent.

14. The process of claim 13 in which the solvent is substantially flashed off after coating the mold surface and prior to molding.

15. A process for producing a molded plastic part by compression or injection molding comprising coating the surface of a compression or injection mold, prior to molding said part and without the use of a release agent, with a coating composition containing form 0.05 to 10% of a reaction promoter for a reactive plastic molding material but not for said coating, said coating composition being selected from the group consisting of polyester, urethane and acrylic polymers, introducing a reactive plastic molding material into the mold, said reactive plastic molding material being selected from the group consisting of polyurethanes, unsaturated polyesters, epoxy resins and phenolics, said reaction promoter in said coating being selected from the group consisting of a catalyst, a crosslinking promoter and a crosslinking initiator for said reactive plastic molding material and being present in an amount sufficient to transfer said coating composition from said mold surface and bond it to the substrate formed by said reactive molding material, molding said part and removing said part from the mold, said molded part upon removal from the mold comprising a plastic substrate and a firmly adherent coating thereon.

16. The process of claim 15 in which the mold surface is selected from the group consisting of a metal and an epoxy resin surface.

17. A molded plastic part having a plastic substrate and a firmly adherent coating thereon produced in accordance with the process of claim 1.

* * * * *